No. 855,051. PATENTED MAY 28, 1907.
T. B. EARHART.
THREAD CUTTING MACHINE.
APPLICATION FILED MAY 9, 1906.

Witnesses
Jos. H. Blackwood
V. T. Landreth Jr.

Inventor
Thomas B. Earhart
By N. A. Gourich
Attorney

UNITED STATES PATENT OFFICE.

THOMAS B. EARHART, OF SACRAMENTO, CALIFORNIA, ASSIGNOR TO EARHART STEEL AND IRON WORKS, OF SACRAMENTO, CALIFORNIA, A CORPORATION OF CALIFORNIA.

THREAD-CUTTING MACHINE.

No. 855,051.  Specification of Letters Patent.  Patented May 28, 1907.

Application filed May 9, 1906. Serial No. 315,953.

*To all whom it may concern:*

Be it known that I, THOMAS B. EARHART, a citizen of the United States, residing at Sacramento, in the county of Sacramento and State of California, have invented certain new and useful Improvements in Thread-Cutting Machines, of which the following is a specification.

My invention relates to machines for threading bolts, shafts, axle spindles, etc., and has for its object the provision of mechanism for simultaneously cutting threads on the outside of a bolt and drilling and threading an orifice in the end of the bolt. This object I accomplish by having the dies for cutting the threads on the outside of the bolt secured to a tubular spindle journaled on a suitable base, and a drill and tap secured to a spindle rotatably mounted in the tubular spindle. By rotating the two spindles in the same direction the threads cut will be in the same direction, though the thread gages may be varied by varying the gages of the dies and tap and the relative speed of the two spindles, while by having the teeth of the dies and tap in opposite directions and rotating the spindles accordingly the threads cut on the outside of the bolt and in the orifice will be in opposite directions and the gages may be varied by varying the relative gages of the tap and dies and the relative speed of the spindles.

The details of construction of my invention will be described hereinafter and illustrated in the accompanying drawings in which—

Figure 1:
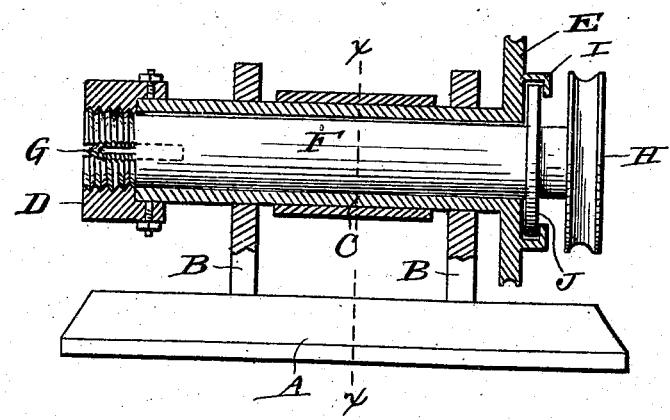
Figure 2:
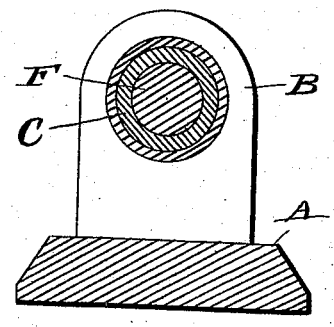

Figure 1 is a longitudinal sectional view of my improved thread cutting machine, and Fig. 2, a cross-section on the line *x—x* of Fig. 1.

In the drawings similar reference characters indicate corresponding parts in both views.

A indicates a suitable base plate adapted to be secured to the table of any suitable lathe (not shown) and having thereon journal-boxes B in which a tubular spindle C is journaled. Spindle C has secured at one end thread cutting dies D and at the other end a pulley E to receive a power belt (not shown) for rotating the spindle.

F represents a spindle rotatably mounted in tubular spindle C having a drill and tap G at the end thereof corresponding with the end of the spindle to which are secured the dies D and at its opposite end a pulley H which may receive a belt (not shown) for rotating said spindle F.

I indicates angular ears secured to the side of pulley E and J an annular shoulder on spindle F between said ears and the face of the pulley, this construction insuring a simultaneous longitudinal movement of the two spindles.

In operation the bolt to be threaded is secured in any suitable work holder and the spindles C and F moved into position to begin the operation after which power is applied to rotate the spindles C and F and the bolt is threaded, exteriorly by the dies D and interiorly by the drill and tap G. It will be understood that if the two spindles are rotated in the same direction threads cut will be in the same direction, while if the spindles are rotated in opposite directions the threads cut will be in opposite directions.

Having thus described my invention what I claim is—

1. A thread cutting machine comprising a tubular spindle mounted to rotate in its bearings, threading dies secured to said spindle, another spindle journaled in said tubular spindle, a combined drill and tap secured to said inner spindle, means to rotate said spindles independently of each other, and means to secure said spindles against relative longitudinal movement, substantially as shown and described.

2. A thread cutting machine comprising a tubular spindle mounted to rotate in its bearings, threading dies secured to one end of said spindle, a pulley secured to the other end of said spindle, another spindle journaled in said tubular spindle so as to rotate independently thereof, a combined drill and tap secured to one end of said inner spindle, a pulley secured to the other end of said inner spindle, an angular shoulder on said inner spindle, and angular ears secured to the first-mentioned pulley and engaging said annular shoulder, substantially as shown and described.

In testimony whereof I hereto affix my signature in the presence of two witnesses.

THOMAS B. EARHART.

Witnesses:
 E. M. KELLEY,
 B. RUBIN.